(12) United States Patent
Cardenas

(10) Patent No.: US 12,355,318 B1
(45) Date of Patent: Jul. 8, 2025

(54) MOTOR EXTRACTION TOOL AND RELATED METHODS

(71) Applicant: Andrew Cardenas, Tehachapi, CA (US)

(72) Inventor: Andrew Cardenas, Tehachapi, CA (US)

( * ) Notice: Subject to any disclaimer, the term of this patent is extended or adjusted under 35 U.S.C. 154(b) by 0 days.

(21) Appl. No.: 18/665,422

(22) Filed: May 15, 2024

(51) Int. Cl.
*H02K 15/50* (2025.01)
*B23P 19/04* (2006.01)

(52) U.S. Cl.
CPC .............. *H02K 15/50* (2025.01); *B23P 19/04* (2013.01)

(58) Field of Classification Search
CPC ......... B23P 19/04; B23P 19/042; B23P 11/00; H02K 15/006; Y10T 29/49822; Y10T 29/53274
See application file for complete search history.

(56) References Cited

U.S. PATENT DOCUMENTS

| | | | |
|---|---|---|---|
| 3,882,951 A | 5/1975 | Conley | |
| 3,950,837 A * | 4/1976 | D'Antoni, Sr. | .... H02K 15/0006 29/762 |
| 4,231,708 A | 11/1980 | Telesio | |
| 4,274,189 A * | 6/1981 | Conover | ............... B25B 27/062 29/256 |
| 4,295,260 A * | 10/1981 | Divers | .................... B25B 27/06 29/234 |
| 5,929,545 A | 7/1999 | Fargo | |
| 6,322,284 B1 | 11/2001 | Bonardo et al. | |
| 6,591,469 B1 * | 7/2003 | Morin | ................... B25B 27/062 29/259 |
| 8,245,681 B2 | 8/2012 | Wanner et al. | |
| 8,826,877 B2 | 9/2014 | Minneker, Jr. | |
| 8,832,921 B2 * | 9/2014 | Marks | ..................... F16B 39/12 269/309 |
| 9,447,763 B2 | 9/2016 | Eichenberger et al. | |
| 9,698,650 B2 | 7/2017 | Filzen et al. | |
| 10,003,234 B2 | 6/2018 | Mai et al. | |
| 2007/0000113 A1 * | 1/2007 | Desilets | ................. F02M 61/14 29/256 |
| 2013/0020886 A1 | 1/2013 | Chan et al. | |

(Continued)

FOREIGN PATENT DOCUMENTS

| | | |
|---|---|---|
| EP | 0388142 A1 | 9/1990 |
| EP | 2988396 B1 | 5/2017 |

(Continued)

OTHER PUBLICATIONS

Lafert Catalogue and Price List, 2024.

(Continued)

*Primary Examiner* — Sarang Afzali
*Assistant Examiner* — Darrell C Ford
(74) *Attorney, Agent, or Firm* — Sierra IP Law, PC; William K. Nelson

(57) ABSTRACT

An integrated motor disconnect tool is mounted at the base of a motor, which is operationally coupled to a gearbox. The tool facilitates the disconnection of the motor from the gearbox via a series of procedural steps. It features a collar flange with an interior surface concentric to the motor's neutral axis, and includes a set of extraction bolts inserted through apertures located on the top surface of the tool.

15 Claims, 12 Drawing Sheets

(56) References Cited

U.S. PATENT DOCUMENTS

2013/0200231 A1\* 8/2013 Catteau ................... F16D 3/06
                                                                    29/466
2016/0294247 A1 10/2016 Bauer

FOREIGN PATENT DOCUMENTS

EP         3591813 B1   5/2021
WO    2015025137 A2   2/2015

OTHER PUBLICATIONS

Lafert Catalogue and Price List, p. 26, B3 Dimensional Data, 2016-2017.
Afert Catalogue and Price List, p. 29, Dimensions-Aluminum Frame Single Phase-3 Phase Flanges B14 / B5—LNA CAT 2019.

\* cited by examiner

MOTOR EXTRACTION TOOL AND RELATED METHODS

FIELD OF THE INVENTION

The present invention relates generally to a tool for removing a motor from an engine assembly. More particularly, the present invention provides a motor extraction tool that is operable to detach a motor connected to a gear train assembly.

BACKGROUND OF THE INVENTION

In automotive and industrial systems, motors may be connected to gear boxes through an output shaft. In the case of automotive systems, the systems include brake motors connected to planetary gear boxes. Whilst the motor is connected to the gearbox, power is translated through an output shaft to allow the gearbox to control the torque and speed of the motor. However, these motors require constant maintenance and repair. Therefore, motors may require detachment from gearboxes, necessitating a method for quick disassembly. A gearbox may be engaged with a brake motor connected to the motor extraction tool. The gearbox may be operable to translate the power delivered by the motor to vary the torque and speed.

Industrial motors are used to provide the necessary mechanical power for various machines. The gearbox is often connected to the motor to enhance its efficiency and performance. Gearboxes modify the output of the motor in terms of speed and torque, making them indispensable in applications requiring precise control of motion and force. Types of gearboxes include spur, helical, bevel, and worm gearboxes, each offering different advantages in terms of power transmission and noise levels.

These motors have to be removed from time to time for servicing or replacement. Often, protective covers or housing around the motor and gearbox assembly need to be removed. This access allows for easier manipulation of the tools and visibility of the connection points. Motors are usually connected to gearboxes via couplings that can be either flange-mounted or through a shaft with a coupling device. These couplings need to be unbolted or otherwise detached. Special tools, like wrenches or Allen keys, might be required depending on the coupling design. The motor is typically secured to the gearbox or a mounting plate with bolts. These bolts need to be carefully removed, often requiring a socket wrench or similar tool. Once disconnected, the physical removal of the motor from the gearbox can proceed. This might require lifting equipment such as hoists or cranes, especially for larger motors, to safely handle the weight and prevent damage to the motor, gearbox, and surrounding infrastructure.

The disassembly process for industrial motors may involve many hours of manual labor, increasing maintenance time and reducing efficiency. Removing industrial motors presents several challenges due to their size, complexity, and integration into larger systems. Removing industrial motors presents several mechanical challenges, primarily due to their size, weight, and integration within complex machinery. These motors are often tightly bolted to gearboxes and may be situated in cramped or hard-to-reach areas, complicating access for tools and personnel. Additionally, disengaging the motor from couplings and driveshafts often requires specific tools and expertise to manage the precise alignment and prevent mechanical strain or misalignment during reinstallation. These motors often require specialized lifting equipment like cranes or hoists to handle safely. The precision with which these motors are integrated into machinery means that disassembly must be carefully planned to avoid damaging sensitive components. The removal process is complex, tedious, and inefficient.

Therefore, there is a need for an invention that provides an efficient disengagement of motors from gearboxes.

SUMMARY OF THE INVENTION

The present invention provides a motor extraction tool operable to remove a brake motor assembly from a gearbox. The motor extraction tool includes collar structures that are complementary to the structures in and around the flange structure of a motor that connects to an underlying gearbox or other structure with which the motor is functionally connected. The collars have extraction apertures that align with one or more bolt holes used to connect the flange structure of the motor to the underlying gearbox or other structure. Extraction bolts are configured to pass through the extraction apertures in the collars, through the bolt holes in the flange structure, and into bolt receivers in the gearbox or other structure, where the extraction bolts bottom out in the bolt receivers. The extraction bolts may be threaded that engage with threading in the bolt holes of the flange structures such that once the extraction bolts bottom out in the bolt receives, the rotation of the extraction bolts advances the bolt holes of the flange along the extraction bolts without threading into the bolt receivers. Thus, the extraction bolts may continue to be rotated to thread the bolt holes of the flange along the extraction bolts to lift the motor after the extraction bolts have bottomed out in the bolt receivers. As the bolt holes of the flange advance, the flange and the motor are pulled away from the underlying gearbox or other structure. By this action, the motor extraction tool removes a motor from an underlying gearbox or other structure to which it is attached.

In some embodiments, the motor extraction tool may include a collar assembly operable to secure to the brake motor assembly. The collar may include multiple extraction apertures positioned around the circumference of the collar operable to receive fasteners. The motor extraction tool may also include extraction bolts each having a proximal head, a threaded section, and a distal unthreaded portion for seating in the bolt receivers of a gearbox or underlying structure without engaging the threading of the bolt receivers.

Collars

In some embodiments, the motor extraction tool may include at least two collars operable to align with the base of the brake motor. Additional alignment may be provided through flanges placed on each collar. The collars may have a geometry that is complementary to the provide a tight and secure connection between the motor flange and extraction tool. For example, the collars may be operable to provide support and strength, ensure alignment, and facilitate extraction of the motor.

The collars may each include a top surface, a bottom surface, contact surfaces, cutouts, and interior curved surface, and outer curved surface. In some embodiments, the top surface may include at least two apertures operable to receive a fastener and the bottom surface may be in contact with the flange of the motor. The interior surfaces of each collar may be concentric to the central axis of the motor.

The collars may be shaped with semi-circular geometries, with an inner radius equivalent or slightly larger than the outer radius of the motor. With this particular design, the collars may be operable to provide a secure fit with the brake motor whilst being secured to the motor flange. The inner radius of the collar may relate to the interior curved surface of the motor, and the outer radius of the collar may relate to outer curved surface of the flange of the motor.

Etraction Apertures

The motor extraction tool may include extraction apertures in each collar that function to both receive extraction bolts and to align the collars with the bolt holes in the motor flanges. The collars may thereby be fitted and aligned around the base of the motor to provide a secure attachment. In some embodiments, the motor extraction tool may include a plurality extraction bolts and at least one collar. The collars of the motor extraction tool may be positioned around the flanges of the motor with the extraction apertures aligned with the bolt holes in the flanges and the underlying bolt receivers of the gearbox or other underlying structure.

Extraction Bolts

The present invention may utilize a specialized set of extraction bolts. The extraction bolts may include a threaded portion and a smooth distal end, in some exemplary embodiments. The threaded portion may be operable to accommodate a nut or other extraction bolt of a flange at a base of a motor. The smooth distal end of the extraction bolt may be operably inserted within the bolt receivers of the gearbox without engaging the threading therein.

Extraction bolt inserted within the apertures of the collar may engage with bolt receivers on, e.g., a planetary gearbox to be connected to the motor. The distal smooth ends of the extraction bolt may be advanced into the bolt receivers by being threaded through the collars of the motor extraction tool and the bolt holes of the flange at the base of the motor until the smooth ends of the extraction bolt bottom out in the bolt receivers. From this point, further rotation of the extraction bolts applies force to the bottom surface of the bolt receivers, resulting in the rotating threads of the extraction bolt applying an upward force and motion on the bolt holes of the motor flange, thereby lifting it away from the bolt receivers.

The fasteners may be torqued using a variety of torquing tools. For example, some torquing tools may include torque wrenches, torque screwdrivers, torque multipliers, hydraulic torque wrenches, pneumatic torque wrenches, and electric torque wrenches.

Assembly

In some embodiments, the motor extraction tool may include at least two collars operable to align with the base of the brake motor. Additional alignment may be provided through flanges placed on each collar. Fasteners may be inserted into the extraction bolt apertures of each collar, and may travel through the apertures in the flange of the motor base. There may be a plurality of fasteners traveling through the collars and flange of the motor base, in some exemplary embodiments.

In some embodiments, the motor may be mounted axially on a gear box or other underlying structure. The motor may include an output shaft operably inserted into, e.g., a gearbox. The gearbox may include several apertures operable to receive extraction bolts passable through the extraction bolt apertures in the collars of the motor extraction tool. To secure the motor extraction tool to the brake motor and gearbox, the extraction bolts may be driven through the extraction bolt apertures, bolt holes in the flange of the motor base, and the bolt receivers of the gearbox or other underlying structure.

In some embodiments, a plurality of motor extraction tools may include a plurality of collars operable to engage with a motor base. Each motor extraction tool may include a plurality of extraction bolt apertures operable to receive a extraction bolts operable to secure a motor extraction tool to the base of the motor and to lift the motor away from an underlying gearbox or other structure.

Disassembly

The motor may be detached from the gearbox or other underlying structure by removing fasteners between the base of the motor and the gearbox or other underlying structure. The fasteners may be removed from the motor base and underlying structure using a torquing tool. The torquing tool may be set to a lower setting to reduce the torque applied to each fastener. In other embodiments, other tools may be used to loosen the fasteners from the motor base. Additionally, the output shaft of the motor may be disengaged from the underlying gearbox or other structure. Disengaging the output shaft of the motor may involve power isolation, releasing tension, and disconnecting couplings. In other implementations, the output shaft of the brake motor may be disengaged using other methods.

Once the fasteners are removed, the collars may be aligned with the motor base such that the extraction bolt apertures align with the bolt holes in the flange of the motor base and the bolt receivers of underlying gearbox or other structure. The extraction bolts may then be advanced through threading in the extraction bolt apertures, the bolt holes in the flange of the base of the motor, and the bolt receivers in the gearbox or other underlying structure. When sufficiently advanced through extraction bolt apertures, the bolt holes in the flange of the base of the motor, and the bolt receivers, the unthreaded distal end of each extract bolt bottoms out in a bolt receiver and further rotation of the extraction bolts advances the flange of the motor base along the extraction bolts, thereby separating the motor from the gearbox or other underlying structure.

In some embodiments, a plurality of motors may be removed from a gearboxes by loosening a plurality of fasteners operably engaged with a motor extraction tool.

It is an aspect of the present invention to provide a tool operable to remove a motor from a gearbox.

It is an aspect of the present invention to provide a method to remove a motor from a gearbox.

Further aspects and embodiments will be apparent to those having skill in the art from the description and disclosure provided herein.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Figure 1:
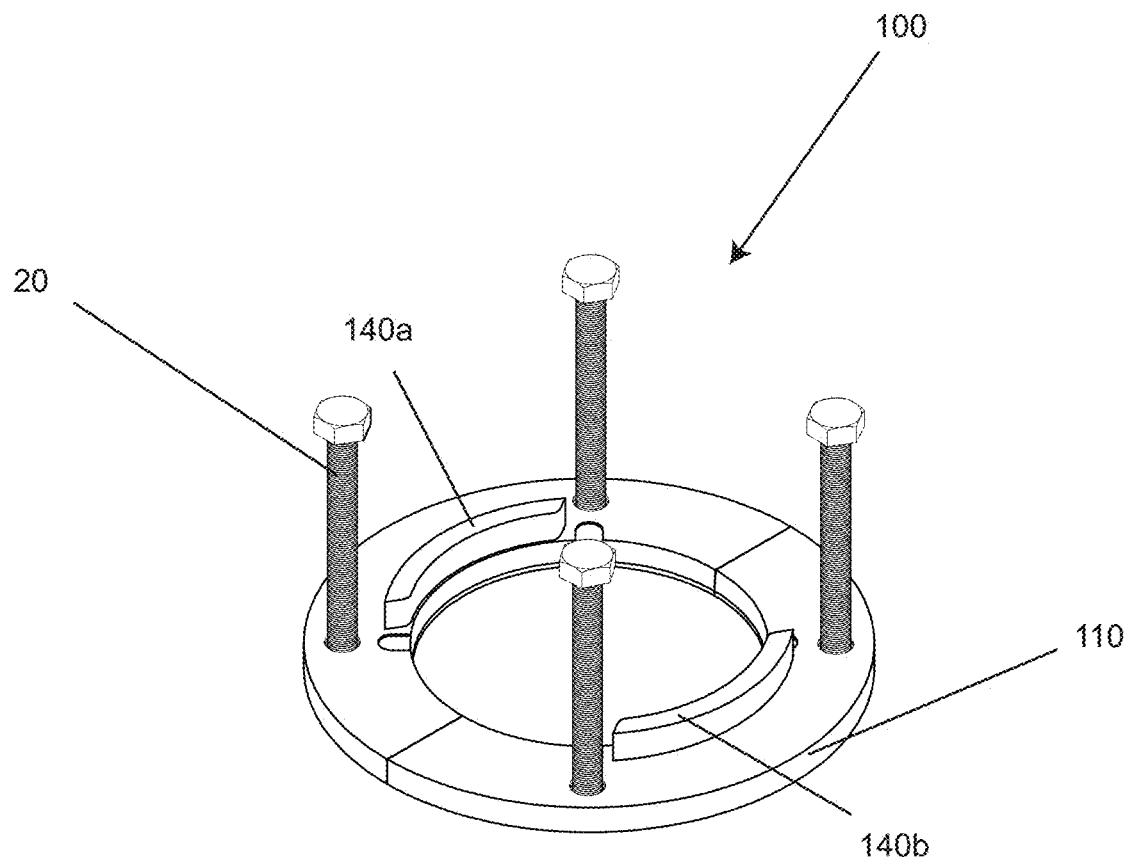
FIG. 1 provides a motor extraction tool, according to an embodiment of the present invention.
Figure 2:
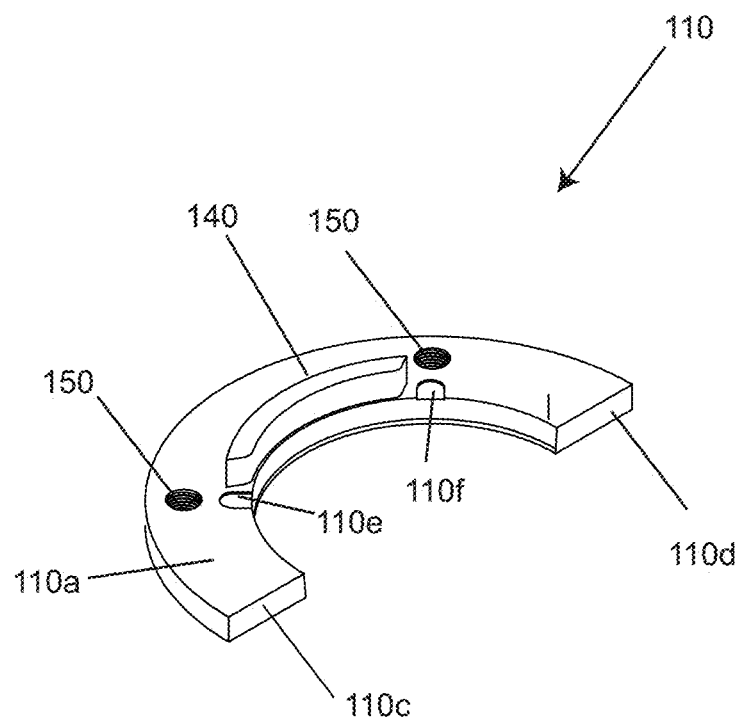
FIG. 2 provides a perspective view of a motor extraction tool, according to an embodiment of the present invention FIG. 3a provides a top view of a motor extraction tool, according to an embodiment of the present invention.
Figure 3A:
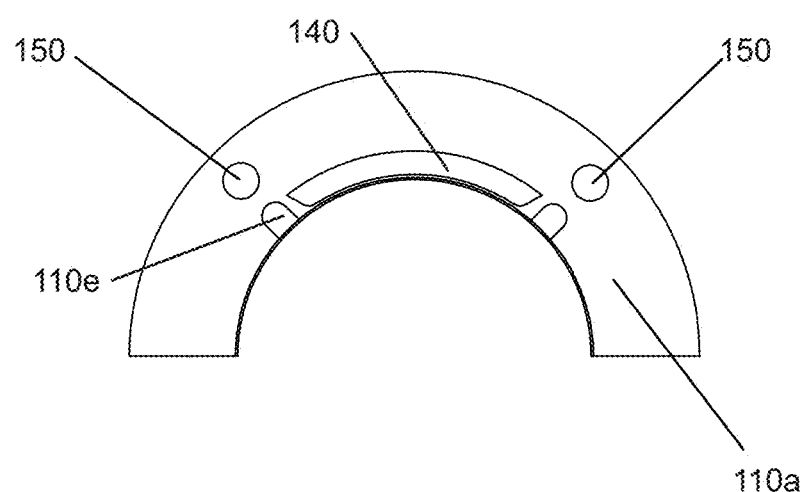
FIG. 3b provides a bottom view of a motor extraction tool, according to an embodiment of the present invention.
Figure 3B:
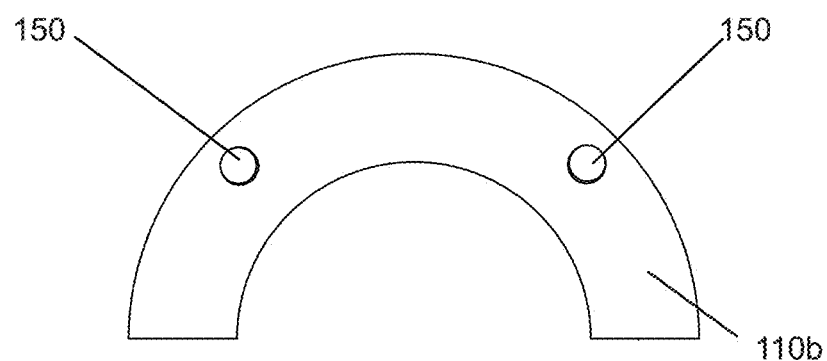
Figure 4A:
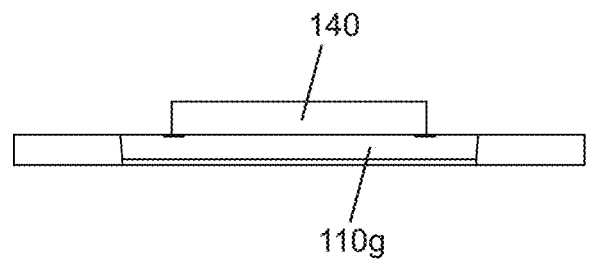
FIG. 4a provides a front view of a motor extraction tool, according to an embodiment of the present invention.
Figure 4B:
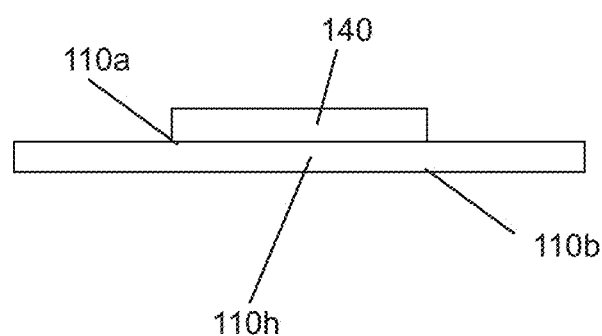
FIG. 4b provides a rear view of a motor extraction tool, according to an embodiment of the present invention.
Figure 5A:
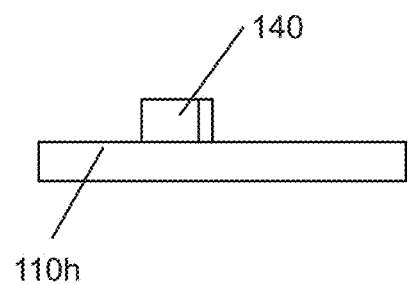
FIG. 5a provides a first side view of a motor extraction tool, according to an embodiment of the present invention.
Figure 5B:
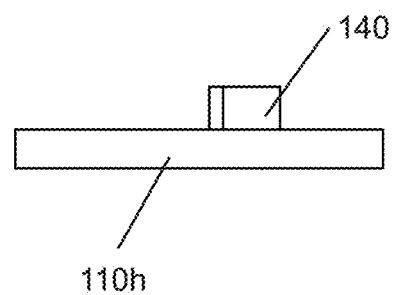
FIG. 5b provides a second side view of a motor extraction tool, according to an embodiment of the present invention.
Figure 6:
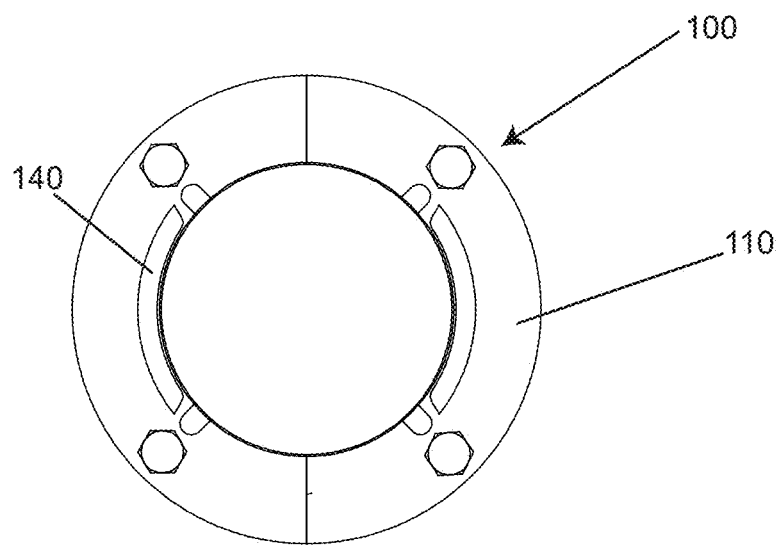
FIG. 6 provides a top view of a motor extraction tool, according to an embodiment of the present invention.
Figure 7:
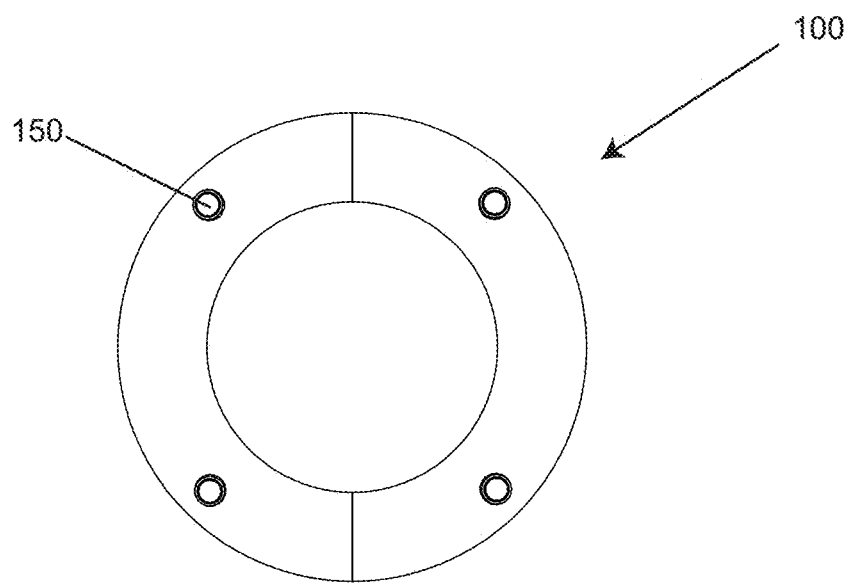
FIG. 7 provides a bottom view of a motor extraction tool, according to an embodiment of the present invention.
Figure 8:
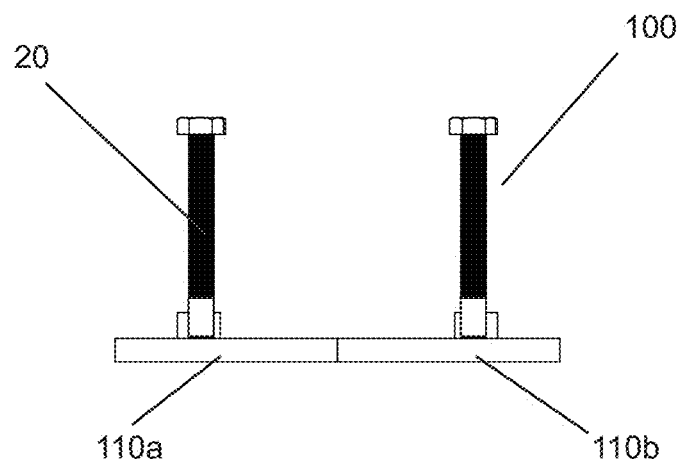
FIG. 8 provides a first side view of a motor extraction tool, according to an embodiment of the present invention.
Figure 9:
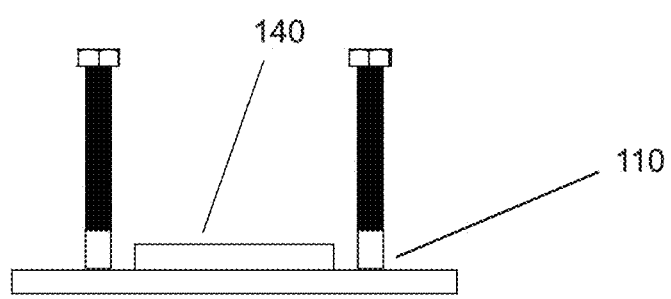
FIG. 9 provides a second side view of a motor extraction tool, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Referring to the drawings, wherein like reference characters designate like or corresponding parts throughout the several views, and referring particularly to FIGS. 1-14, it is seen that the present invention includes various embodiments of a motor extraction tool operably incorporated into a motor and gear box.

The present invention concerns a motor extraction tool 10 that is operable to remove a motor 40 from a gear box 70. As illustrated in FIG. 1, the motor extraction tool 10 may include extraction bolts 20 operably inserted into extraction bolt apertures 150 of collar 110 within the flange 140. The motor extraction tool 10 may temporarily secure to a motor 40 around the circumference of the motor enclosure and is operable to disassemble a motor from a planetary gear box 70.

In some embodiments, the motor extraction tool 100 may align with the base 42 of motor 40 of motor assembly 100. The extraction bolts 20 may be advanced through the extraction bolt apertures 150, the bolt holes in the base 42 of the motor 40, and the bolt receivers of the gearbox 70. Motor 40 may be thereby disengaged from gearbox 70.

The motor 40 may require regular maintenance and repair to improve the durability and performance. However, motor 40 attached to gearbox 70 may be difficult to remove because the gearbox and motor components may be seized together. Most operations may require the manual removal of components from both motor 40 and gearbox 70, increasing labor time and reducing efficiency. Therefore, the present invention relates to a motor extraction tool 100 operable to remove motor 40 from gearbox 70 with efficiency and reduced labor time. Disassembly of motor 40 from gearbox 70 may be made efficient through the use of motor extraction tool 100 with collars 110 and extraction bolt 20, which may be torqued to improve stability of motor assembly 100.

Figure 10:
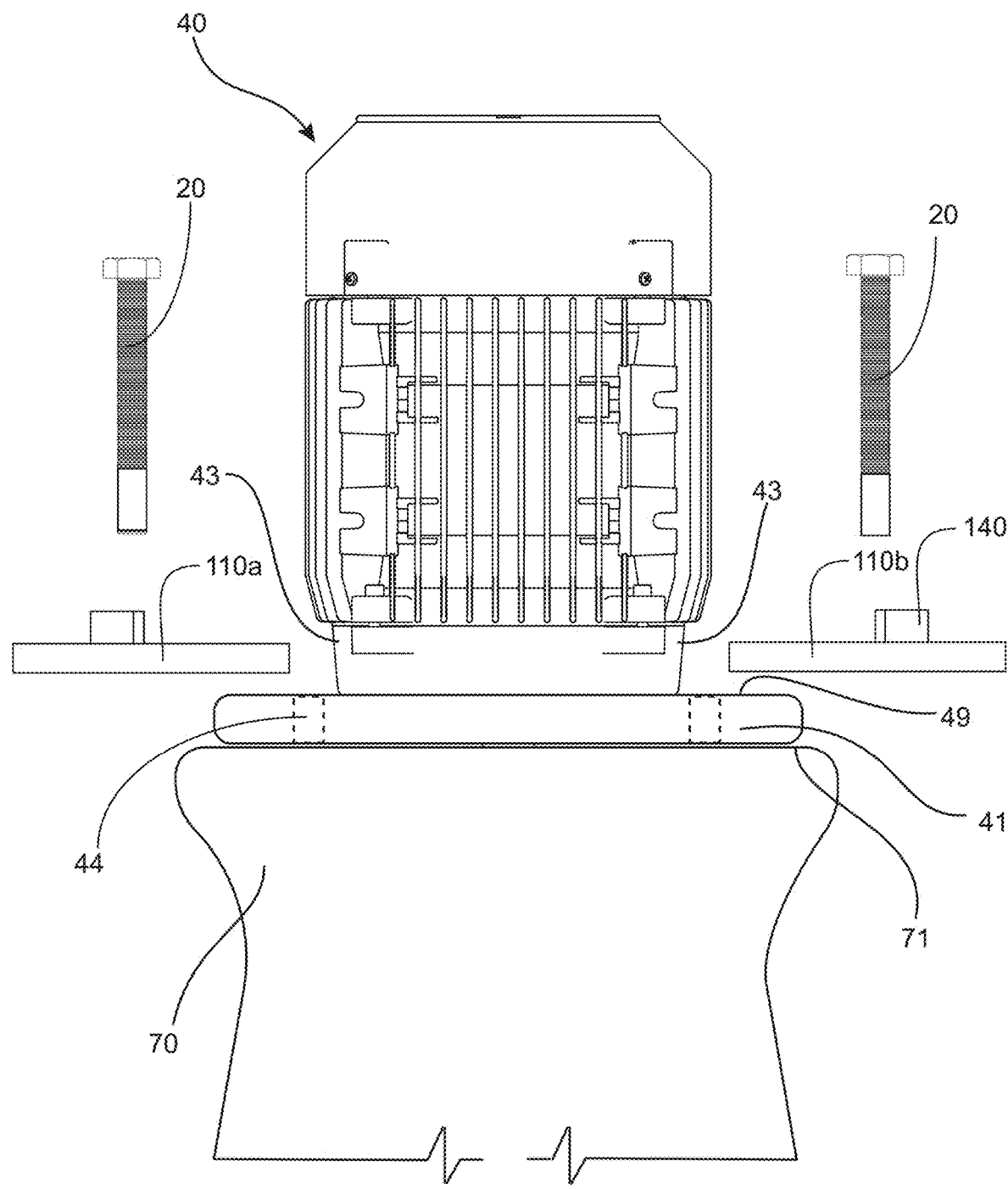
FIG. 10 provides an exemplary side view of the first step of using the motor extraction tool to remove a motor from a gearbox, according to an embodiment of the present invention.
Figure 11:
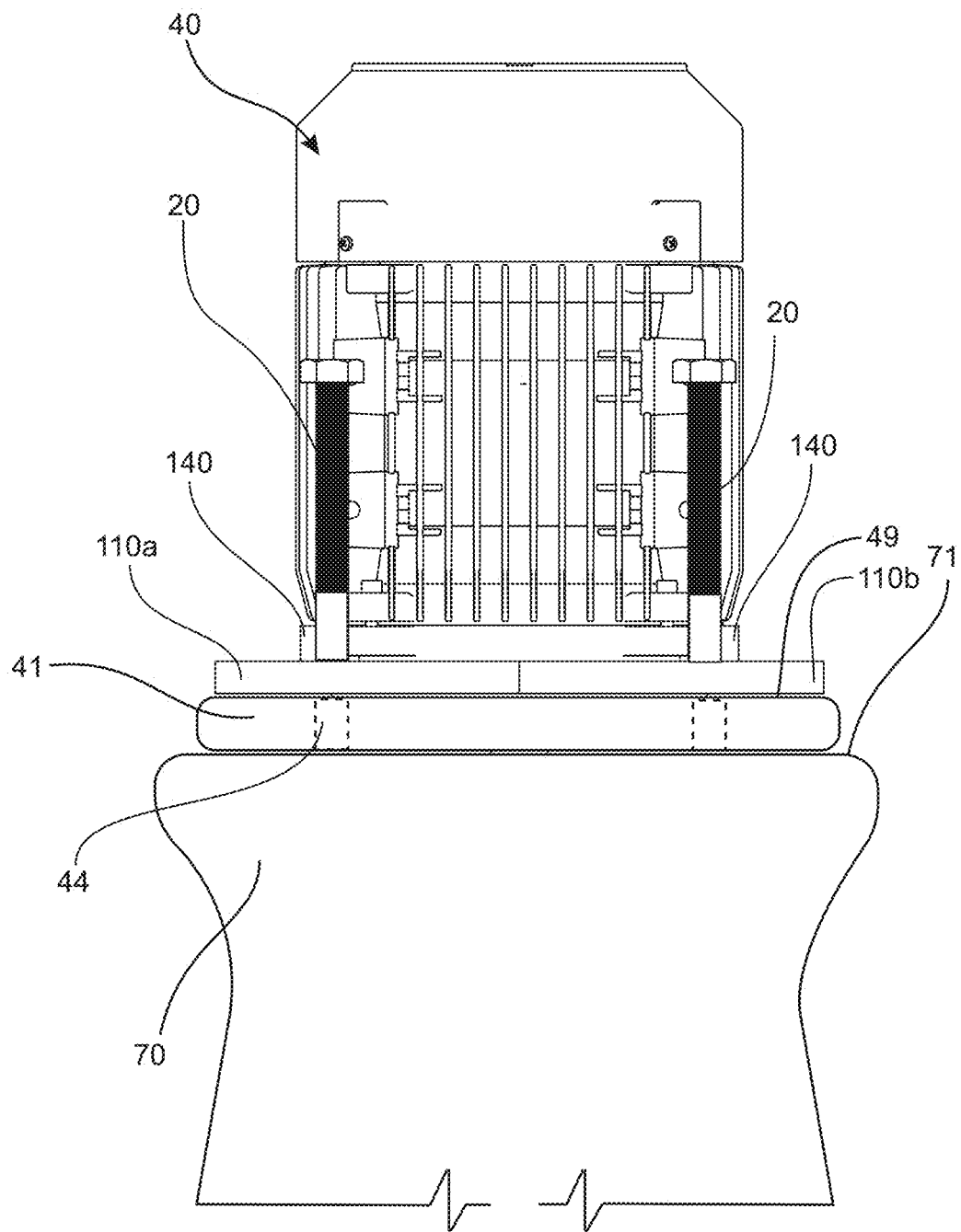
FIG. 11 provides an exemplary side view of the second step of using the motor extraction tool to remove a motor from a gearbox, according to an embodiment of the present invention.
Figure 12:
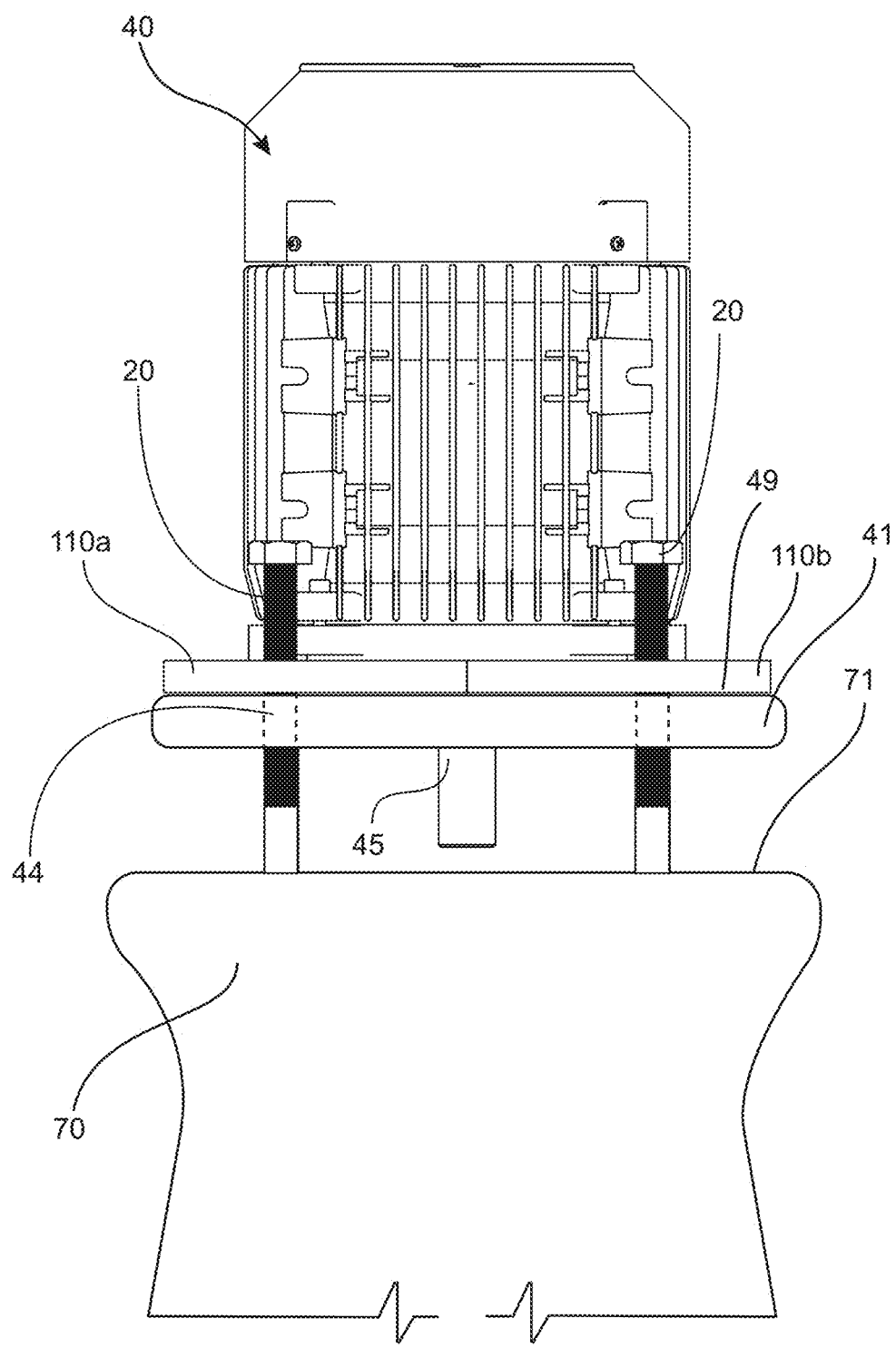
FIG. 12 provides an exemplary side view of a motor removed from a gearbox using the extraction tool, according to an embodiment of the present invention.

In some embodiments, the motor extraction tool 100 may include at least two collars (110a, 110b) that may have an exterior geometry that is complementary to a base 42 of motor 40, and couples around the motor enclosure. In such embodiments, the collars 110 may include flanges (140a, 140b) that are operable to secure the motor extraction tool 100 to the base 42 of motor 40. The Collars 110 may include a top surface 110a, a bottom surface 110b, contact surfaces 110c-110d, cutouts 110e-110f, interior curved surface 110g, and outer curved surface 110h, as shown in FIGS. 2-5. The cutouts 110e-110f may be complementary and accommodate the geometry of the motor base 42, and the top surface 110a may include at least one extraction bolt apertures 150 operable to receive an extraction bolt 20 whilst the bottom surface 110b is in contact with the gearbox 70. In some embodiments, as illustrated in FIG. 10-12 the motor may include a flange 41 having at least one through holes 44 that may be threaded or not threaded. In such embodiments, the collars (110) may be sandwich between the top surface 49 of the motor flange 41 and the motor housing. In other embodiments, the collar flange 140 may be positioned with in the motor recess 43.

When assembling motor the extraction tool 100 the contact surfaces 110c-110d of collar 110a may join with a second collar 110b also including contact surfaces (110c, 110d), respectively, thereby providing uniform circumferential pressure around the exterior surface of the motor 40 and preventing damage to the internal mechanical structure of the motor 40. The Interior curved surface 110g may be concentric to the central axis of the motor 40.

In some embodiments, the collar 110 may include cutouts 110e-110f that are operable to align and provide clearance to complementary fasteners (not shown) the motor's enclosure together.

In some embodiments, there may be at least two apertures 150 placed around the top surface 110a operable to receive at least two fasteners 20. In other embodiments, there may be a plurality of apertures 150 operable to receive a plurality of fasteners 20. The positioning and number of apertures 150 is related to the size of the gearbox 70 and motor 40 combination. In large application there may be as many as twenty apertures, however there may be substantially more in very large applications such as electric motors in naval geartrain systems.

In most embodiments, the collar 110 may have an interior geometry that has a semi-circular shape, with an inner radius equivalent or slightly larger than the outer radius of the brake motor 40. With this particular design, the collars 110 may be operable to provide a securely engage with the exterior surface of the brake motor 40 whilst being secured to the gearbox 70. The inner radius of the collar 110 may relate to the interior curved surface 110g, and the outer radius of the collar 110 may relate to outer curved surface 110h. In most embodiments, not limiting the invention, there may be flange 140a or 140b placed on collars 110. Flanges 140a-140b may be seen on the top surface 110a of collar 110. Flanges 140a-140b may be operable to provide alignment between the brake motor 40 and collars 110. In some embodiments, there may be a recess 43 within brake motor 40 operable to receive flanges 140a-140b. The recess 43 may be constructed of a similar geometry to flanges 140a-140b to provide a rigid fitting. In other embodiments, there may be an extrusion in the motor 40 and the flanges may have a recess 43 that complement the motor extrusion.

Figure 13:
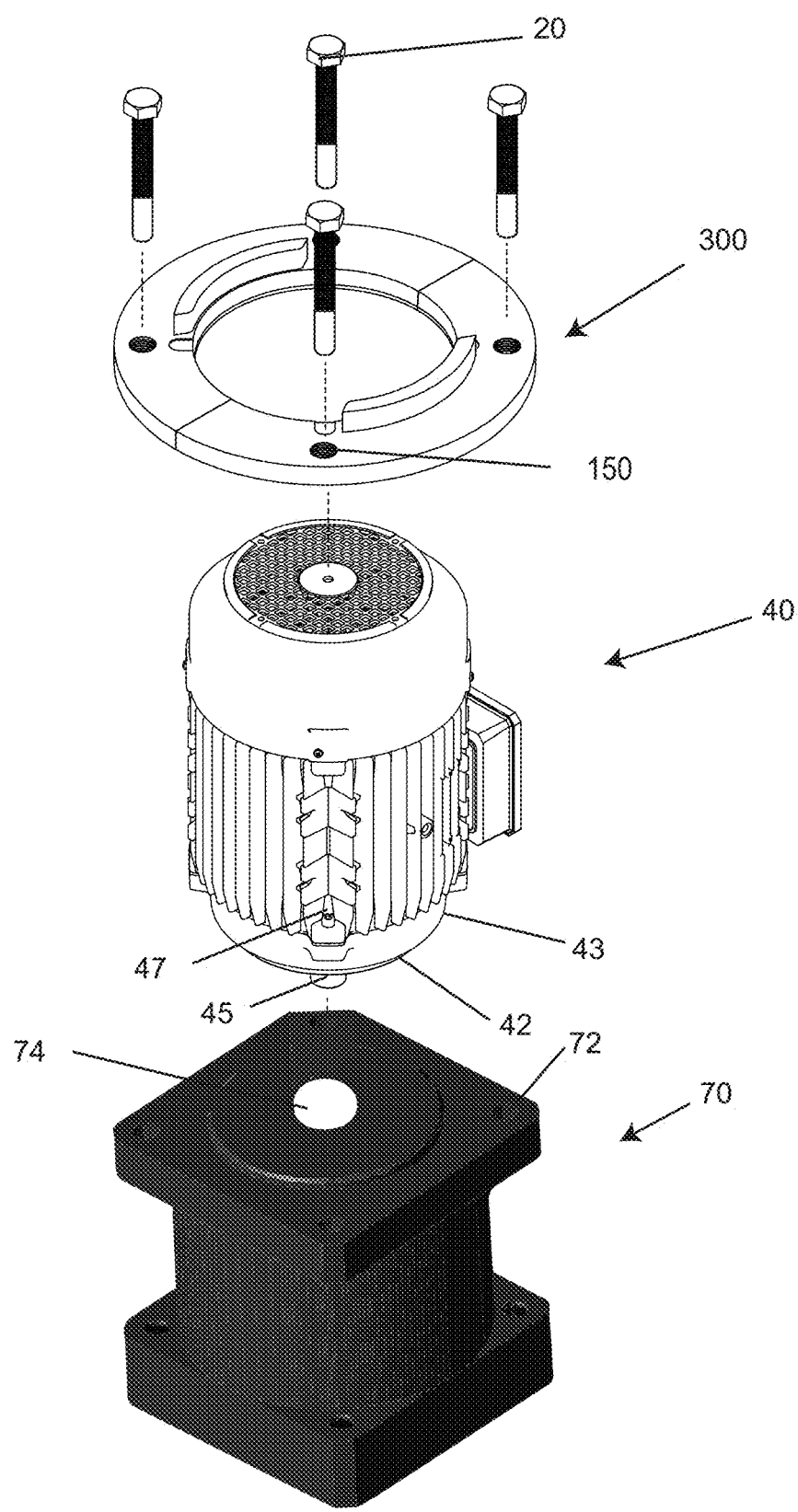
FIG. 13 provides an exploded perspective view of a motor extraction tool, according to an embodiment of the present invention.
Figure 14:
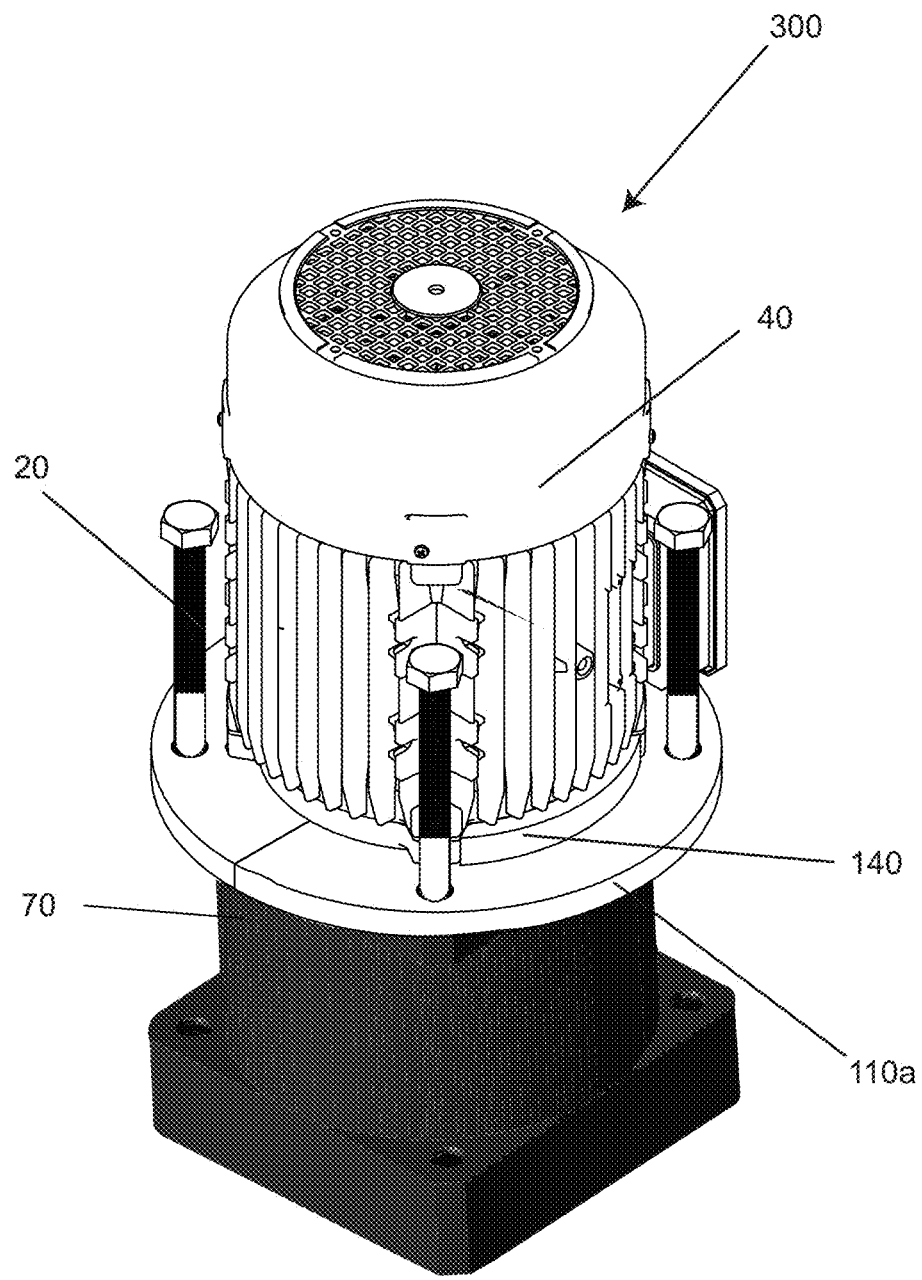
FIG. 14 provides an environmental perspective view of a motor extraction tool, according to an embodiment of the present invention.

In other applications as illustrated in FIGS. 13-14, the extraction bolts 20 may be advanced through the apertures 150 and may be operable to disengage the collars 110 and motor base 42 from the gearbox 70. Once inserted through all components, the Extraction bolts 20 may be torqued using a torquing tool (not shown). The amount of torque applied may range between 8,850 to 221,000 lbf-in. In other embodiments, the amount of torque applied may vary depending on the application and type of motor 40 used.

In some exemplary embodiments, the motor 40 may include complementary apertures 47 operable to align with the cutouts 110e-110f of collar 110.

In some embodiments, the fastener 20 may be a bolt with two separate ends. Fastener 20 may include a threaded end towards the head, and a solid end towards the tip. The solid end (not shown) may facilitate the application of torque within the motor extraction tool 100. The threaded end may be operable to resist the tension received at the solid end of fastener 20.

By torquing Extraction bolts 20, the motor extraction tool 100 may secure the brake motor 40 with a controlled level of tension. For example, torquing the fastener may improve the integrity and performance of the tool 10 and the stability of the motor 40 whilst engaged with the gearbox 70.

In some embodiments, the Extraction bolts 20 may be torqued using a torque wrench or other tool. Examples of torquing tools may include torque wrenches, torque screwdrivers, pneumatic torque wrenches, electric torque wrenches, and the like. The type of Extraction bolts 20 used within the motor extraction tool 100 may vary depending on the application, motor 40, and gearbox 70. For example, some types of fasteners may include bolts, screws, nuts, studs, set screws, lag bolts, and the like. In most exemplary embodiments, the fastener 20 may be a bolt. In some embodiments, the extraction bolts 20 may have a hex head on one end and a bearing with a flat surface that is operable to all the bolts 20 to freely rotate thereby preventing threading into the gearbox 70 and reducing strain on the gearbox 70.

In some embodiments, the motor 40 may include an output shaft 45 engaged with an input receptacle 74 of gearbox 70. Motor 40 may include a motor base 42 designed with a series of base apertures (not shown) positioned around the circumference of the motor 40. There may be a variety of motors 40 used within motor assembly 100. Some examples of motors may include brake motors, yaw motors, DC motors, electric motors, and the like. In other embodiments, there may be a different motor used within motor assembly 100. In some embodiments, the electric motor 40 may be equipped with various flanges 41 and bolt pattern types, which are critical for its versatile mounting and integration into different mechanical systems. The motor design includes, but is not limited to, a B5 flange pattern, (shown in FIGS. 10-12) characterized by a circular flange with evenly spaced bolt holes located on the flange perimeter, and a B14 flange pattern, distinguished by a smaller, concentric bolt circle that facilitates compact installations. Additionally, the motor supports the D-flange pattern, (shown in FIGS. 13-14) which includes a D-shaped flange that allows for direct mounting onto mating equipment without additional adapters or couplings. These flange types are complemented by multiple bolt patterns, including symmetric, asymmetric, and custom configurations, which are designed to meet various application-specific requirements and ensure a secure, reliable connection in diverse operational environments.

In application, as illustrated in FIGS. 10-12, a motor 40 may be fixed to the gearbox 70 with motor-gearbox fasteners (not shown); the motor 40 may have a flange 41 that includes a through holes 44 and the gearbox 70 may include a top surface 71. The motor-gearbox fasteners may be removed (not shown) and the motor may be seized to the gearbox 70. To disengage the motor 40 from the gearbox 70 the collars (110a, 110b) may be positioned between the flange 41 and the collar flanges (140a, 140b) may be positioned between the recess 43. The extraction bolts may be aligned with the apertures 150 and advanced through the motor flange 41 via the through holes 44, as illustrated in FIG. 11. As the extraction bolts 20 are advanced, the bolts engage with the gearbox 70 top surface 71, and the motor 40 is disengaged from the gearbox as illustrated in FIG. 12.

In some embodiments, the motor extraction tool 100 may be coupled to a motor 40 and gearbox 70, forming motor assembly 300, as shown in FIGS. 13 and 14. The collars 110 may be placed at opposite ends of motor base 42, where flanges 140a-140b may align with recesses 43. The interior surface 110g of collars 110 may align concentrically with the motor base 42, and contact surfaces 110c-110d may be used to secure at least two collars 110 along motor 40. The extraction bolts 20 may be inserted into apertures 150 of motor extraction tool 100. In some exemplary embodiments, the recesses 43 may align the motor extraction tool 100 with the apertures 72, and the extraction bolts 20 may be torqued using a torquing tool to disengage the motor 40 from the gearbox 70.

Once the motor 40 is removed from the gearbox 70 the extraction bolts 20 may remain secured to the motor extraction tool 100. In some embodiments, where the motor 40 includes a flange 41 the extraction bolts 20 may be removed using a torquing tool. Once Extraction bolts 20 are removed from apertures 150 and 47, the motor 40 may disengage from the gearbox 70, allowing removal of collar 110 from motor 40.

When removing extraction bolts 20 from motor extraction tool 100, the collar 110 may separate into two pieces with flanges 140a and 140b and the motor 40 may be lifted as a result. Therefore, the disassembly of motor 40 from gearbox 70 may be facilitated by the advancement of the extraction bolts 20 and collar flange 10.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A method for disassembling a motor assembly from a gearbox, comprising the steps of:
   a. removing fasteners from said motor assembly and gearbox;
   b. aligning a first collar and a second collar around said motor, wherein each of said first and second collars each has:
      i. an interior curved surface that when aligned collectively form a continuous annular opening with a consistent edge, and
      ii. a top surface with apertures that align with a bolt-hole pattern of said motor;
   c. nesting said first and second collar under a neck portion of the motor having a circumference, wherein said continuous annular opening complements said circumference of the neck portion and the top surface of the first collar and the top surface of the second collar are coplanar during the nesting step;
   d. inserting an extraction bolt through each aperture of said first and second collar and into the corresponding bolt hole of said motor; and
   e. advancing said extraction bolt against a top surface of said gearbox, thereby lifting said first and second collar and motor off said gearbox.

2. The method of claim 1, further comprising decoupling a motor output shaft from said gearbox, and removing each of said extraction bolts from said motor and said collar.

3. The method of claim 2, wherein said motor includes complementary apertures concentric to said apertures on the top surface of both the first collar and the second collar.

4. The method of claim 1, wherein each collar includes two apertures having threading therein.

5. The method of claim 1, further comprising the steps of aligning a collar flange with a motor recess, wherein said collar flange has a top surface that engages with a bottom surface of said motor.

6. The method of claim 1, wherein said interior curved surface of said first collar and said second collar are concentric to a neutral axis of said motor.

7. The method of claim 1, wherein said extraction bolts include a distal end having a rotatable interface, a proximal end having a hex end, and threading therebetween.

8. A method for disassembling a motor assembly from a gearbox, comprising the steps of:
   a. aligning a first collar and a second collar around and under a circumference of a motor, wherein said first and second collars each include:
      i. an interior curved surface,
      ii. an exterior curved surface, and
      iii. a top surface with apertures, wherein the interior curved surfaces of said first collar and said second collar together form an opening that is complementary to an outer radius of the motor and the top surfaces of the first collar and the second collar are coplanar when aligned;
   b. inserting an extraction bolt through each aperture of said first and second collar; and
   c. advancing said extraction bolt against a top surface of said gearbox, thereby lifting said first and second collar and motor off said gearbox.

9. The method of claim 8, further comprising decoupling a motor output shaft from said gearbox, and removing each of said extraction bolts from said collar.

10. The method of claim 8, wherein each collar includes two apertures having threading therein.

11. The method of claim 8, wherein said motor includes complementary apertures aligned with said apertures on the top surface of both the first collar and the second collar.

12. The method of claim 11, further comprising removing fasteners from said motor assembly and gearbox.

13. The method of claim 8, further comprising the steps of aligning a collar flange with a motor recess, wherein said collar flange has a top surface that engages with a bottom surface of said motor.

14. The method of claim 8, wherein said interior curved surface of said first collar and said second collar are concentric to a neutral axis of said motor.

15. The method of claim 8, wherein said extraction bolts include a distal end having a rotatable interface, a proximal end having a hex end, and threading therebetween.

* * * * *